United States Patent
Berg et al.

(10) Patent No.: US 8,639,542 B2
(45) Date of Patent: Jan. 28, 2014

(54) METHOD AND APPARATUS TO FACILITATE DEVELOPMENT OF A CUSTOMER-SPECIFIC BUSINESS PROCESS MODEL

(75) Inventors: Eric Berg, Bedford, NH (US); Krishna Kilambi, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 818 days.

(21) Appl. No.: 10/602,260

(22) Filed: Jun. 23, 2003

(65) Prior Publication Data

US 2004/0027388 A1 Feb. 12, 2004

Related U.S. Application Data

(60) Provisional application No. 60/392,443, filed on Jun. 27, 2002.

(51) Int. Cl.
*G06Q 10/00* (2012.01)
*G06Q 10/06* (2012.01)

(52) U.S. Cl.
CPC .................... *G06Q 10/063* (2013.01)
USPC ........................................ 705/7.11

(58) Field of Classification Search
None
See application file for complete search history.

(56) References Cited

U.S. PATENT DOCUMENTS

| | | | |
|---|---|---|---|
| 5,630,069 A * | 5/1997 | Flores et al. .................. 705/7 |
| 5,745,901 A * | 4/1998 | Entner et al. ............. 707/103 R |
| 5,953,707 A * | 9/1999 | Huang et al. .................. 705/10 |
| 6,023,572 A * | 2/2000 | Lautzenheiser et al. ......... 703/2 |
| 6,038,538 A * | 3/2000 | Agrawal et al. .................. 705/7 |
| 6,055,519 A * | 4/2000 | Kennedy et al. ................ 705/80 |
| 6,088,679 A | 7/2000 | Barkley ............................. 705/8 |
| 6,167,564 A * | 12/2000 | Fontana et al. ............... 717/104 |
| 6,188,403 B1 * | 2/2001 | Sacerdoti et al. ............. 715/764 |
| 6,208,345 B1 * | 3/2001 | Sheard et al. ................. 715/853 |
| 6,236,994 B1 | 5/2001 | Swartz et al. ..................... 707/6 |
| 6,256,773 B1 * | 7/2001 | Bowman-Amuah .......... 717/121 |
| 6,275,976 B1 * | 8/2001 | Scandura ....................... 717/120 |
| 6,289,380 B1 | 9/2001 | Battat et al. ................... 709/224 |
| 6,289,382 B1 * | 9/2001 | Bowman-Amuah .......... 709/226 |
| 6,308,161 B1 * | 10/2001 | Boden et al. ...................... 705/7 |
| 6,330,007 B1 * | 12/2001 | Isreal et al. .................... 715/762 |
| 6,415,027 B1 | 7/2002 | Malik |
| 6,418,450 B2 | 7/2002 | Daudenarde |
| 6,574,635 B2 | 6/2003 | Stauber et al. |
| 6,601,234 B1 * | 7/2003 | Bowman-Amuah .......... 717/108 |
| 6,647,394 B1 | 11/2003 | Herzberg et al. |
| 6,662,355 B1 * | 12/2003 | Caswell et al. ............... 717/103 |

(Continued)

FOREIGN PATENT DOCUMENTS

EP 1 030 258 A2 8/2000 .............. G06F 17/60
WO WO 99/05632 7/1998 .............. G06F 17/60

OTHER PUBLICATIONS

Juan Sanchez Diaz et al., "From User Requirements to User Interfaces: A Methodological Approach," 13th Int. Conf., CAiSE 2001, in 2068 Lecture Notes in Comp. Sci. 60 (K.R. Dittirch, et al. eds., Springer Jun. 4-8, 2001).*

(Continued)

*Primary Examiner* — Brett Feeney
(74) *Attorney, Agent, or Firm* — Campbell Stephenson, LLP

(57) ABSTRACT

A business process model pertaining to an application product is associated with a set of views that illustrate the realization of the business process in the application product. Further, the business process model is displayed to the user together with the set of views to enhance the user's understanding of the business process provided by the application product.

20 Claims, 10 Drawing Sheets

(56) References Cited

U.S. PATENT DOCUMENTS

| | | | |
|---|---|---|---|
| 6,738,736 B1* | 5/2004 | Bond | 703/2 |
| 6,820,118 B1* | 11/2004 | Leymann et al. | 709/223 |
| 6,920,474 B2* | 7/2005 | Walsh et al. | 705/7 |
| 6,931,625 B1* | 8/2005 | Coad et al. | 717/109 |
| 6,957,186 B1 | 10/2005 | Guheen et al. | 705/1 |
| 6,970,844 B1* | 11/2005 | Bierenbaum | 705/39 |
| 6,985,939 B2 | 1/2006 | Fletcher et al. | 709/223 |
| 7,017,162 B2 | 3/2006 | Smith et al. | 719/328 |
| 7,035,944 B2 | 4/2006 | Fletcher et al. | 709/250 |
| 7,047,518 B2* | 5/2006 | Little et al. | 717/108 |
| 7,080,092 B2 | 7/2006 | Upton | 707/102 |
| 7,155,715 B1 | 12/2006 | Cui et al. | 717/177 |
| 7,184,967 B1* | 2/2007 | Mital et al. | 705/8 |
| 7,236,966 B1 | 6/2007 | Jackson et al. | 707/1 |
| 7,269,625 B1 | 9/2007 | Wilhide et al. | 709/206 |
| 7,290,256 B2 | 10/2007 | Anderson et al. | 717/165 |
| 7,321,886 B2 | 1/2008 | Swaminathan et al. | 706/60 |
| 7,340,469 B1 | 3/2008 | Alghathbar et al. | 1/1 |
| 7,343,605 B2* | 3/2008 | Langkafel et al. | 719/316 |
| 7,373,358 B2 | 5/2008 | Ronnewinkel et al. | 707/102 |
| 7,398,512 B2 | 7/2008 | Martin et al. | 717/105 |
| 7,479,970 B2 | 1/2009 | Christman et al. | 345/660 |
| 7,487,079 B2* | 2/2009 | Benny et al. | 703/22 |
| 7,496,887 B2 | 2/2009 | Grasselt et al. | 717/101 |
| 7,562,339 B2 | 7/2009 | Racca et al. | 717/102 |
| 7,610,575 B2 | 10/2009 | Sproule | 717/103 |
| 7,657,436 B2 | 2/2010 | Elmore et al. | 705/1.1 |
| 7,831,453 B2 | 11/2010 | Das | 705/7.27 |
| 7,895,070 B2 | 2/2011 | Das et al. | 705/7.13 |
| 7,941,438 B2* | 5/2011 | Molina-Moreno et al. | 707/756 |
| 2002/0016954 A1* | 2/2002 | Charisius et al. | 717/2 |
| 2002/0038335 A1* | 3/2002 | Dong et al. | 709/203 |
| 2002/0038336 A1 | 3/2002 | Abileah et al. | 709/203 |
| 2002/0104071 A1* | 8/2002 | Charisius et al. | 717/109 |
| 2002/0144256 A1 | 10/2002 | Budhiraja et al. | 717/174 |
| 2002/0184070 A1* | 12/2002 | Chen et al. | 705/9 |
| 2002/0184610 A1* | 12/2002 | Chong et al. | 717/109 |
| 2002/0188597 A1* | 12/2002 | Kern et al. | 707/1 |
| 2003/0028651 A1 | 2/2003 | Schreckengast et al. | 709/229 |
| 2003/0084127 A1 | 5/2003 | Budhiraja et al. | 709/220 |
| 2003/0093575 A1 | 5/2003 | Upton | 709/310 |
| 2003/0105884 A1 | 6/2003 | Upton | 709/318 |
| 2003/0105887 A1 | 6/2003 | Cox et al. | 705/34 |
| 2003/0110315 A1 | 6/2003 | Upton | 709/328 |
| 2003/0120539 A1* | 6/2003 | Kourim et al. | 705/11 |
| 2003/0177121 A1 | 9/2003 | Moona et al. | 707/9 |
| 2003/0187707 A1 | 10/2003 | Hack et al. | 705/7 |
| 2003/0200130 A1 | 10/2003 | Kall et al. | 705/8 |
| 2003/0217176 A1 | 11/2003 | Beunings | 709/238 |
| 2004/0001092 A1* | 1/2004 | Rothwein et al. | 345/763 |
| 2004/0027388 A1 | 2/2004 | Berg et al. | 345/781 |
| 2004/0133876 A1 | 7/2004 | Sproule | 717/105 |
| 2004/0162741 A1 | 8/2004 | Flaxer et al. | 705/7 |
| 2004/0204970 A1* | 10/2004 | Boden et al. | 705/7 |
| 2004/0221238 A1* | 11/2004 | Cifra et al. | 715/762 |
| 2004/0225671 A1 | 11/2004 | Carroll et al. | 707/101 |
| 2005/0010931 A1* | 1/2005 | Langkafel et al. | 719/328 |
| 2005/0044197 A1 | 2/2005 | Lai | 709/223 |
| 2005/0071750 A1 | 3/2005 | Nelson | 715/503 |
| 2005/0114201 A1* | 5/2005 | Walsh et al. | 705/10 |
| 2005/0138031 A1 | 6/2005 | Wefers | 707/9 |
| 2005/0197880 A1* | 9/2005 | Walsh et al. | 705/8 |
| 2005/0223392 A1 | 10/2005 | Cox et al. | 719/328 |
| 2006/0074703 A1 | 4/2006 | Bhandarkar et al. | 705/1 |
| 2006/0184410 A1 | 8/2006 | Ramamurthy et al. | 705/8 |
| 2007/0083421 A1 | 4/2007 | McNair et al. | 705/10 |
| 2007/0226023 A1 | 9/2007 | Das et al. | 705/7 |
| 2007/0226038 A1 | 9/2007 | Das et al. | 705/10 |

OTHER PUBLICATIONS

Mohammed Elkoutbi et al., "Generating User Interface Prototypes from Scenarios," Proceedings of the 4th IEEE International Symposium on Requirements Engineering, p. 150 (1999).*

Mohammed Elkoutbi & Rudolf K. Keller, "User Interface Prototyping Based on UML Scenarios and High-Level Petri Nets," ICATPN 2000, LNCS 1825, p. 166 (M. Nielsen & D. Simpson, eds., Springer 2000).*

Andreas Homrighausen et al., "Round-Trip Prototyping for the Validation of Requirements Specifications," REFSQ 2001 (Jun. 2001).*

Andreas Homrighausen et al., "Round-Trip Prototyping Based on Integrated Functional and User Interface Requirements Specifications," 7 Requirements Engineering 34 (2002).*

James Lin et al., "DENIM: Finding a Tighter Fit Between Tools and Practice for Web Site Design," CHI Letters, vol. 2, iss. 1, p. 510 (Apr. 1-6, 2000).*

Hongzheng "Cindy" Lu, "A User Interface Design Requirment Document: What's Wrong With It?," Proc. Human Factors and Ergonomics Society, 295 (2000).*

Mark W. Newman & James A. Landay, "Sitemaps, Storyboards, and Specifications: A Sketch of Web Site Design Practice," DIS 2000 (ACM 2000).*

Nuno Jardim Nunes & Joao Falcao e Cunha, "Wisdom—Whitewater Interactive System Development with Object Models," in "Object Modeling and User Interface Design," 197 (Mark Van Harmelen, ed., Addison-Wesley Longman 2001).*

Nuno J. Nunes & Joao F. Cunha, "Wisdom: A Software Engineering Method for Small Software Development Companies," IEEE Software (Sep./Oct. 2000).*

PCT Search Report, PCT/US03/19955, 5 pages, Jan. 20, 2004.

Reinwald, Berthold, et al., *Structured Workflow Management with Lotus Notes Release 4*, Digest of Papers of COMPCON (Computer Society Conference), 1996 Technologies for the Information Superhighway, Santa Clara, Feb. 25-28, 1996, pp. 451-457.

Paul, Santanu, et al., *RainMan: A Workflow System for the Internet*, Proceedings of Usenix Symposium on Internet Technologies and Systems, Dec. 10, 1997, http://www.usenix.org/publications/library/proceedings/usits97/full_papers/paul/paul_html/paul.html.

Lavana, Hemang, et al., *Executable Workflows: A Paradigm for Collaborative Design on the Internet*, Proceedings of the 34$^{th}$ Annual ACM/IEEEConference on Design Automation, Jun. 9, 1999, http://portal.acm.org/citation.cfm?id=266283.

Walters, Garrison, *Essential Guide to Computing: The Story of Information Technology*, Prentice Hall, Aug. 1, 2000, chapters 1-3.

Ambroszkiewicz, "Web Service Integration as a New Paradigm for Networked Computing," 2002 IEEE.

Chan et al., "Information Integration Platform for CIMS," 2000 IEEE, pp. 743-747.

Bao et al., "Integrating Through User Interface: A Flexible Integration Framework for Third-Party Software," 1996 IEEE, pp. 336-342.

Ponnekanti, Shankar R. and Fox, Armando, "Application-Service Interoperation Without Standardized Service Interfaces," Proceedings of the First IEEE International Conference on Pervasive Computing and Communications, pp. 1-8, 2003 IEEE.

Iteractive and Incremental Development From Wikipedia, the free encyclopedia first posted on Mar. 31, 2005 and downloaded Jan. 24, 2009.

Internet Archive Website Showing Article Posting From Wikipedia Download Jan. 24, 2009 from http://web.archive.org/web/*/http://en.wikipedia.org/wiki/Iterative_and_incremental_development.

Larman, Craig, "Iterative and Incremental Development: A Brief History" Published by the IEEE Computer Society, Jun. 2003.

Owen, Martin and Raj, Jog, "BPMN and Business Process Management Introduction to the New Business Process Modeling Standard," Popkin Software, downloaded from http://www.bpmn.org/Documents/6AD5D16960.BPMN_and_BPM.pdf on Jan. 27, 2009.

BPMN—Internet Archive Wayback Machine downloaded from http://web.archive.org/web/*/http://www.bpmn.org/Documents/6AD5D16960.BPMN_and_BPM.pdf on Jan. 27, 2009 at 5:45:36 PM.

Exley, Richard Mark et al., U.S. Appl. No. 10/653,028, filed Aug. 28, 2003, entitled "Universal Application Network Architecture."

Minxin Shen and Duen-Ren Liu, "Coordinating Interorganizational Workflows Based on Process-Views," DEXA 2001, LNCS 2113, pp. 274-283, 2001.

Stonebraker, Michael, "Too Much Middleware," EECS Department M.I.T. SIGMOD Record, vol. 31, No. 1, Mar. 2002.

* cited by examiner

METHOD AND APPARATUS TO FACILITATE DEVELOPMENT OF A CUSTOMER-SPECIFIC BUSINESS PROCESS MODEL

RELATED APPLICATIONS

This application claims the benefit of U.S. Provisional Application No. 60/392,443, filed Jun. 27, 2002.

FIELD OF THE INVENTION

This invention relates generally to business process modeling, and more particularly to facilitating development of a customer-specific business process model.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Siebel Systems, Inc., All Rights Reserved.

BACKGROUND OF THE INVENTION

The Internet is transforming corporate architectures. Businesses are now recreating themselves to become more efficient and to find new business opportunities. For example, businesses are moving existing processes such as order entry processes onto the Internet while simultaneously incorporating entirely new processes such as email-based customer support into their computing systems. By shifting some tasks onto the Web and then integrating them with existing client/server or mainframe applications, businesses are transforming into an eBusiness with a unified enterprise computing system.

The development of a unified enterprise computing system is a long and complex process, especially for large businesses. Extensive planning is needed to determine the amount of configuration required to meet the organization's business strategy and to standardize processes across the organization. In addition, a typical organization has numerous business requirements, and it is a challenge to uncover these business requirements and implement them in a controlled phase approach.

Current providers of eBusiness applications have not been able to achieve much success in reducing cost and complexity of application integration and accelerating time to deployment. One of the reasons for this inability is that a company is rarely convinced that an eBusiness application offered by the provider satisfies the company's business needs. As a result, the provider has to go through a lengthy process of collecting the company's business requirements, making significant changes to the application in accordance to the business requirements and deploying the modified application. Furthermore, because different organizations have different business requirements and employ different strategy, the provider typically has to repeat this inefficient and costly process for each customer.

SUMMARY OF THE INVENTION

The present invention relates to various aspects for manipulating business process data and presenting the business process data to a user.

According to one aspect of the present invention, a business process model pertaining to an application product is associated with a set of views that illustrate the realization of the business process in the application product. Further, the business process model is displayed to the user together with the set of views to enhance the user's understanding of the business process provided by the application product.

The present invention describes systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
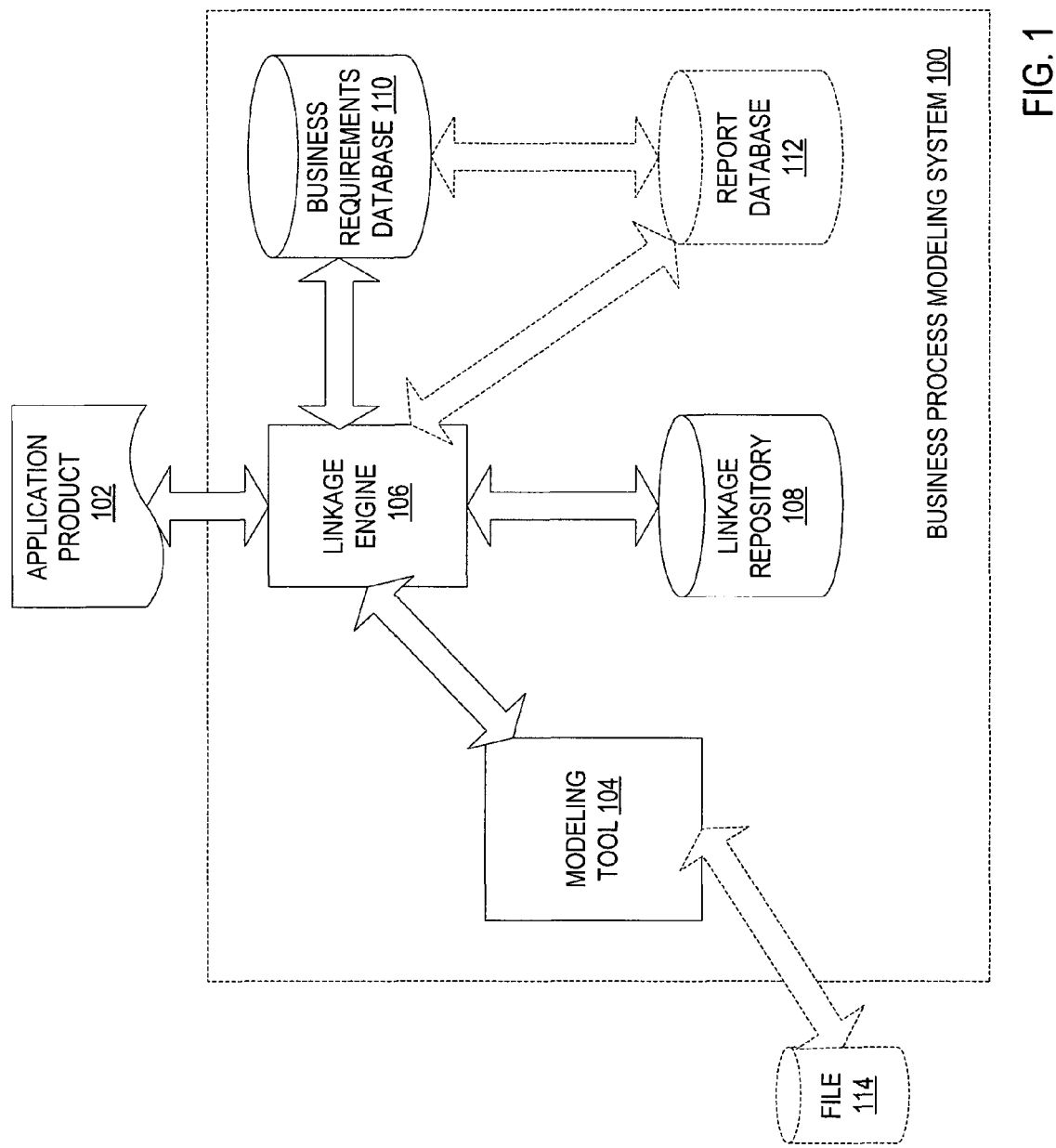
FIG. 1 is a block diagram of one embodiment of a business process modeling system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The present invention relates to various aspects for manipulating business process data and presenting the business process data to a user. In one embodiment, the business process data is first prepared for the presentation and then displayed to the user in a desired format. During the preparation phase, an application product is identified and a business process model pertaining to the application product is associated with a set of views that illustrate the realization of a business process in the application product. The business process model is created in a modeling language. A view corresponds to a specific user interface within the application product. In one embodiment, the view is an image representing a corresponding user interface. As will be discussed in greater detail below, the association of the business process model with the set of views is accomplished, in one embodiment, by creating a view for each user interface, storing an identifier of each view in a repository and creating in the repository a link between each view identifier and one or more steps (also referred to herein as activities) contained in the business process model.

During the presentation phase, the business process model is displayed to the user together with a set of views. The set of views may be selected from the views previously linked to the data process model. In one embodiment, the set of views presented to the user can be modified. That is, the user can request to delete some views, add new views or replace some views with different views. In one embodiment, in response to a user request to navigate to a specific view in the application product, a corresponding portion of the application program is executed and the user is presented with an actual user interface that the user can interact with (e.g., enter data, click buttons, etc.). As a result, the user can observe the realization of the business process in the application product and determine whether this business process satisfies the desired functionality.

In one embodiment, the user is provided with an option to request a transfer of business process data into a business requirements database. When the user submits a request for transfer, the business process data is transformed into a set of business requirements that are transferred to the business requirements database. In one embodiment, relationships between the business requirements are defined based on the structure of the business process model and maintained in the business requirements database. In one embodiment, when the business process model is modified, the business requirements stored in the business requirements database are modified accordingly. In another embodiment, the business requirements are modified directly in the business requirements database based on user input. The modified business requirements can then be exported to an external file that may subsequently be used to create a new business process model satisfying the modified business requirements.

In one embodiment, a development of a customer-specific business process model is facilitated using the presentation of business process information as described above. In this embodiment, the business process information pertains to a standard application product developed for a specific industry based on the best practices found in this industry. A business process model created for the industry standard application product is displayed to a customer with a set of views that illustrate the realization of a business process in the application product. This presentation of business process data enhances the customer's understanding of the functionality provided by the standard application product, assists in mapping of the customer's business requirements to standard functions and maximizes the use of standard functionality in the customized product.

In one embodiment, the development of a customer-specific application product is facilitated by transforming the business process model associated with the standard application product into a set of standard business requirements and storing the set of standard business requirements in the business requirements database. Further, when the standard business process model is modified according to the customer's needs, a set of customer-specific business requirements is created using the modified business process model and stored in the business requirements database. The two sets of business requirements can then be compared and analyzed to determine which components of the standard application product need to be modified to provide the functionality desired by the customer.

Business Process Modeling System

FIG. 1 is a block diagram of one embodiment of a business process modeling system 100. System 100 includes a modeling tool 104, a business requirements database 110, a linkage engine 106, and a linkage repository 108.

Modeling tool 104 is responsible for creating a business process model for an application product 102. Modeling tool 104 may be any known in the art modeling tool. Modeling tool 104 creates a business process model using a modeling language such as a unified modeling language (UML).

Business requirements database 110 stores various business requirements. Business requirements database 110 may be a part of a commercially available requirement management tool or an independent database such as a relational database, a flat-file database, a network database, or a hierarchical database. Data stored in business requirements database 110 may be received from modeling tool 104 and/or entered by the user.

Linkage engine 108 is responsible for preparing to the presentation of business process information to the user and for enabling the presentation of the business process information in such a manner as to enhance the user's understanding of a business process. During the preparation phase, linkage engine 108 associates a business process model created by modeling tool 104 with a group of views associated with application product 102. In one embodiment, the association between the business process model and the views is accomplished using linkage repository 108 that stores view identifiers (e.g., view names) and maintains a relationship between each view identifier and one or more activities contained in the business process model.

During the presentation phase, linkage engine 106 allows the user to select a set of views for display with the business process model. In addition, linkage engine 106 provides the user with an option to navigate to a specific view in the application product 102. That is, when the user requests navigation, linkage engine 106 sends a command to application product 102, triggering the display of an actual user interface in the execution mode.

Linkage engine 108 is further responsible for linking modeling tool 104 to business requirements database 110. In particular, linkage engine 108 allows the user to request transfer of business process data to business requirements database 100. Upon receiving the user's request for transfer, linkage engine 108 transforms a business process model created by modeling tool 104 into a set of business requirements. In one embodiment, linkage engine 108 creates relationships between the business requirements based on the structure of the business process model. In one embodiment, linkage engine 108 updates data stored in business requirements database 110 with additions or changes to a corresponding business process model in modeling tool 104. Alternatively, linkage engine 108 allows the creation of a business process model in modeling tool 104 from data stored in business requirements database 110. For example, the user may modify business requirements in business requirements database 110 directly. Then, the modified business requirements may be exported to an external file that can subsequently be used as an import file 114 into modeling tool 104. Linkage engine 106 provides an interface for importing data from file 114 to modeling tool 104. In one embodiment, file 114 has a specific format such as a spreadsheet format or comma-separated-values (CSV) format.

In one embodiment, linkage engine 108 provides for export of data stored in business requirements database to reporting database 112. Once the user requests such export (e.g., by selecting a designated button), linkage engine 108 extracts the data from business requirements database 110 and transfers it to reporting database 112.

Preparation for Presentation of Business Process Information

Figure 2:
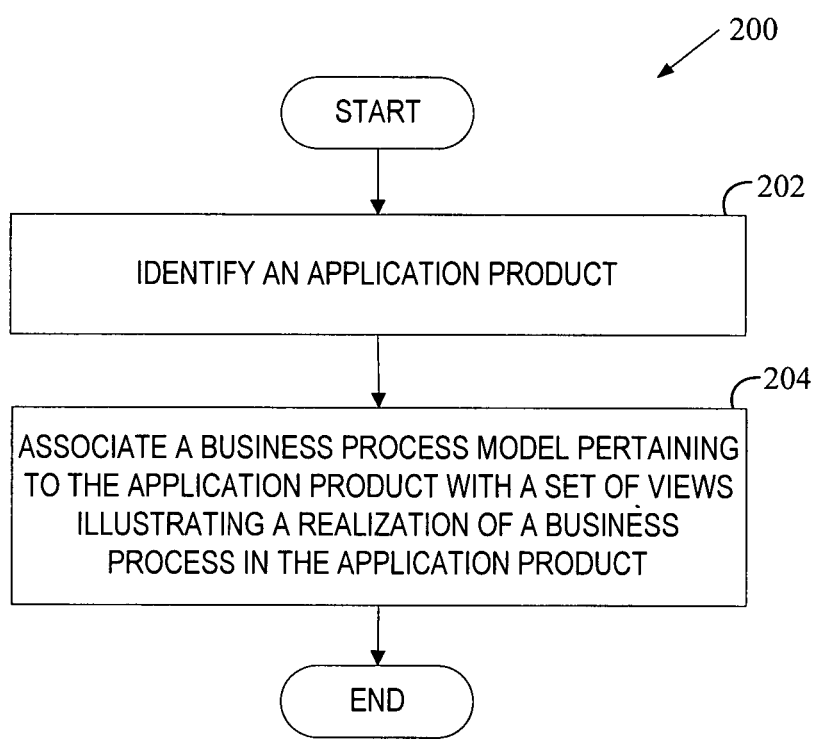
FIG. 2 is flow diagram of one embodiment of a process for facilitating the presentation of business process information.

FIG. 2 is flow diagram of one embodiment of a process 200 for facilitating the presentation of business process information. The process may be performed by processing logic that may comprise hardware (e.g., circuitry, dedicated logic, etc.), software (such as run on a general purpose computer system or a dedicated machine), or a combination of both.

Referring to FIG. 2, process 200 begins with processing logic identifying an application product (processing block 202). In one embodiment, the application product is a standard product defined for a specific industry based on the best practices found in this industry. Alternatively, the application product may not be a standard application product (e.g., it may be a complete or incomplete customer-specific application product being tested).

Next, processing logic associates a business process model pertaining to the application product with a set of views illustrating the realization of the business process in the application product (processing block 204). In one embodiment, the business process model is created in a modeling language from data contained in an input file (e.g., a file having a spreadsheet format or CSV format). As described above, each view is an image representing a particular user interface within the application product. In one embodiment, each view is assigned an identifier (e.g., a view name), and the association between the business process model and the views is accomplished by linking each view to one or more activities within the business process model.

Figure 3:
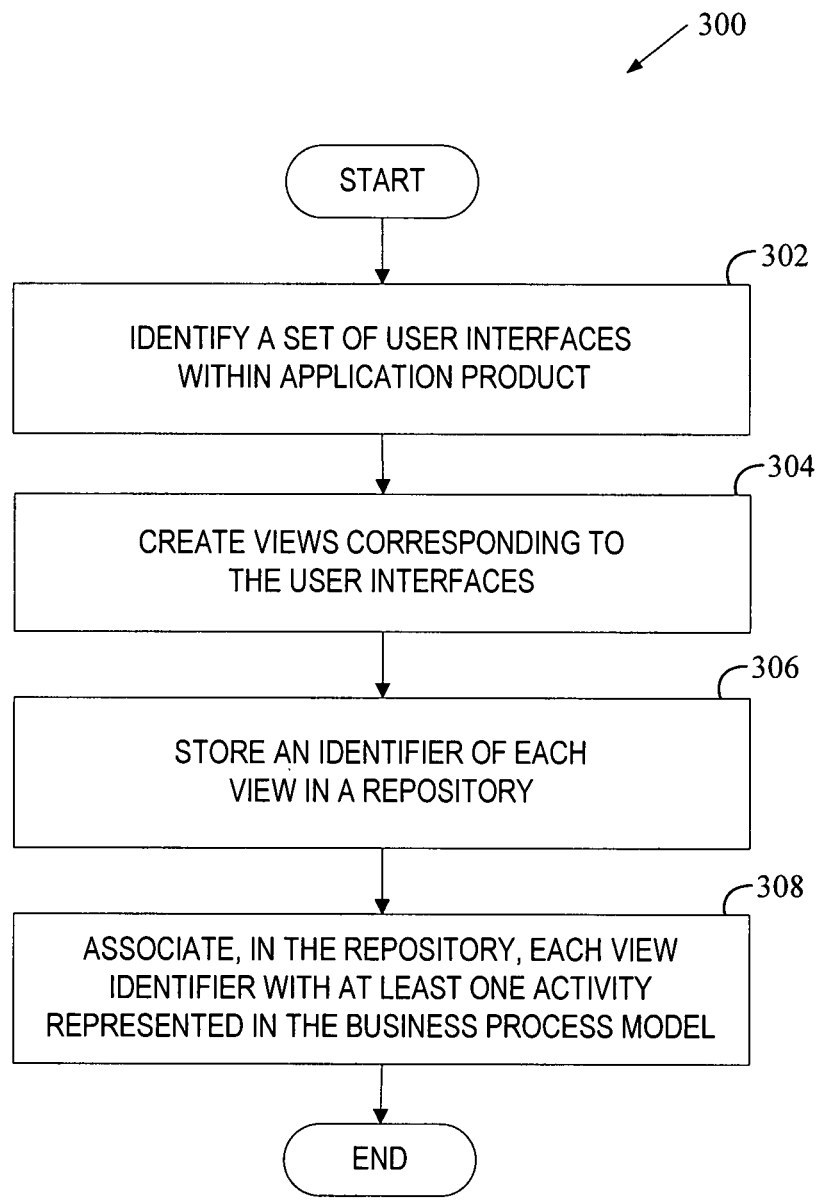
FIG. 3 is a flow diagram of one embodiment of a process for associating a business process model with a set of views.

FIG. 3 is a flow diagram of one embodiment of a process 300 for associating a business process model with a set of views. The process may be performed by processing logic that may comprise hardware (e.g., circuitry, dedicated logic, etc.), software (such as run on a general purpose computer system or a dedicated machine), or a combination of both.

Referring to FIG. 3, process 300 begins with processing logic identifying a set of user interfaces within an application product (processing block 302). Next, processing logic creates views corresponding to the user interfaces (processing block 304) and stores view identifiers in a repository such as linkage repository 108 (processing block 306). In one embodiment, each view identifier are stored with the application product identifier, an identifier of the corresponding user interface if this identifier is different from the view identifier, and an identifier of a collection of user interfaces that includes the user interface associated with the specific view. The collection of user interfaces (also referred to as a screen) is formed based on a particular activity that the user interfaces are designated to perform. In one embodiment, the view (i.e., the image) is also stored in the repository with the view identifier. Alternatively, the views are stored in a separate file.

Further, each view identifier is mapped to one or more activities represented in the business process model. In one embodiment, in which the code or notations within the application product refer to the activities represented in the business process model (e.g., by the activity name or other identifier), the mapping is done based on this code or notations.

Afterwards, processing logic associates each view with one or more activities in the repository (processing block 308).

In one embodiment, processing logic creates a file for use during the presentation of business process data to the user. The file may store the name of the application product, the name of each screen (i.e., a collection of user interfaces combined for a specific activity) within the application product, and the name of each view associated with the screen.

Presentation of Business Process Data

Figure 4:
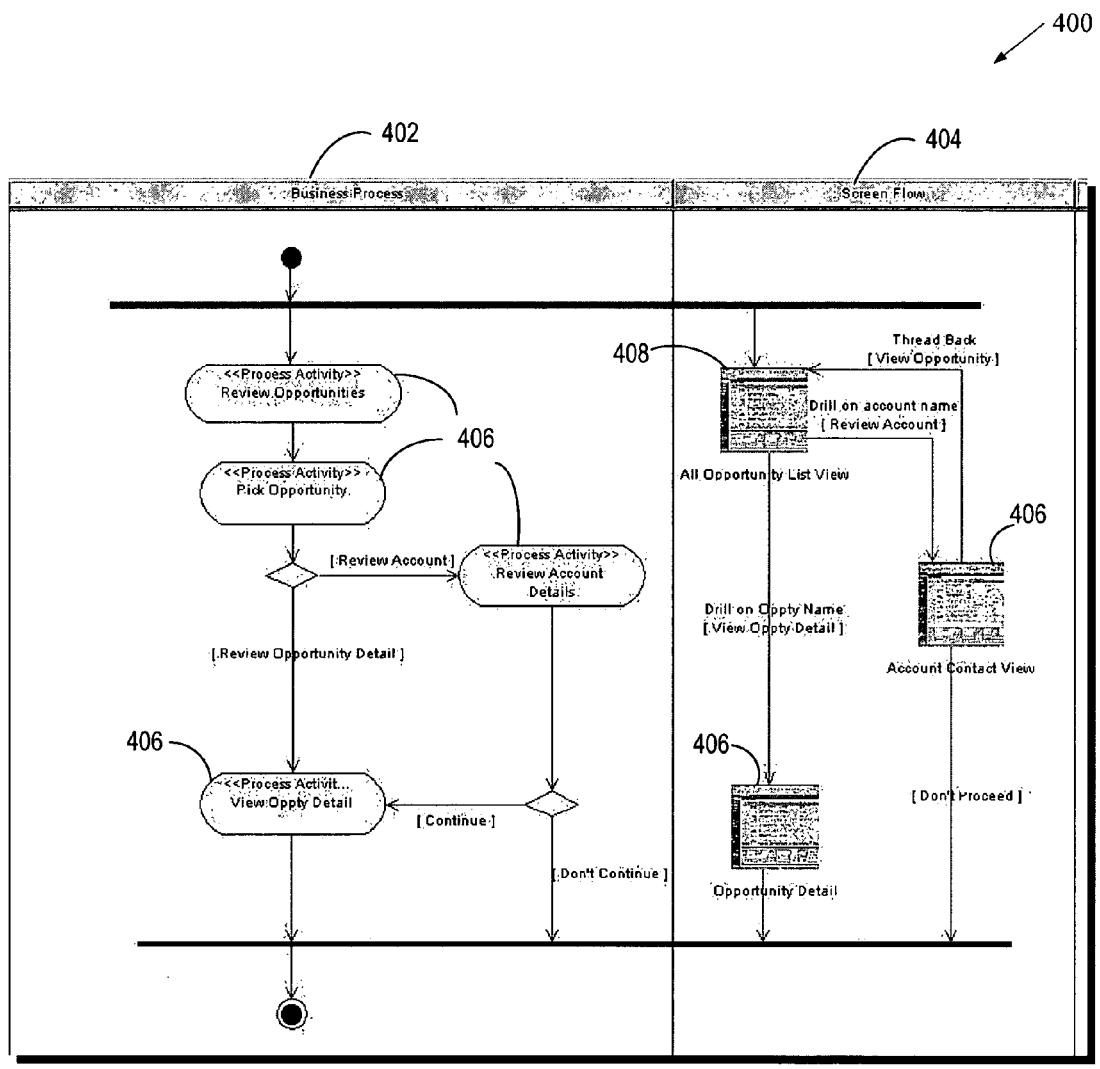
FIG. 4 illustrates a user interface for presenting business process data to a user, according to one embodiment of the present invention.

FIG. 4 illustrates a user interface 400 for presenting business process data to a user, according to one embodiment of the present invention. It should be noted that any known in the art modeling tool can be used to present business process data to the user without loss of generality.

Referring to FIG. 4, user interface 400 displayed on a portion of a computer screen consists of two parts: a business process part 402 and a screen flow part 404. Part 402 displays a business process model 402, and part 404 displays a set of views 404. The business process model created for a specific application product represents a number of business process steps (referred to herein as activities) 406. Views 408 are images (e.g., bitmap images) representing user interfaces provided by the application product. Views 408 illustrate the realization of the business process in the application product. The display of the business process model together with the corresponding views enhances the visual representation of the functionality provided by the application product, thus bringing a greater understanding of the business process realized in the application product.

In one embodiment, the user is allowed to modify the set of views displayed with the business process model. Specifically, the user can request to delete a view, add a new view or edit an existing view (e.g., change the image of the view, the name of the view, the size of the view, etc.).

Figure 5A:
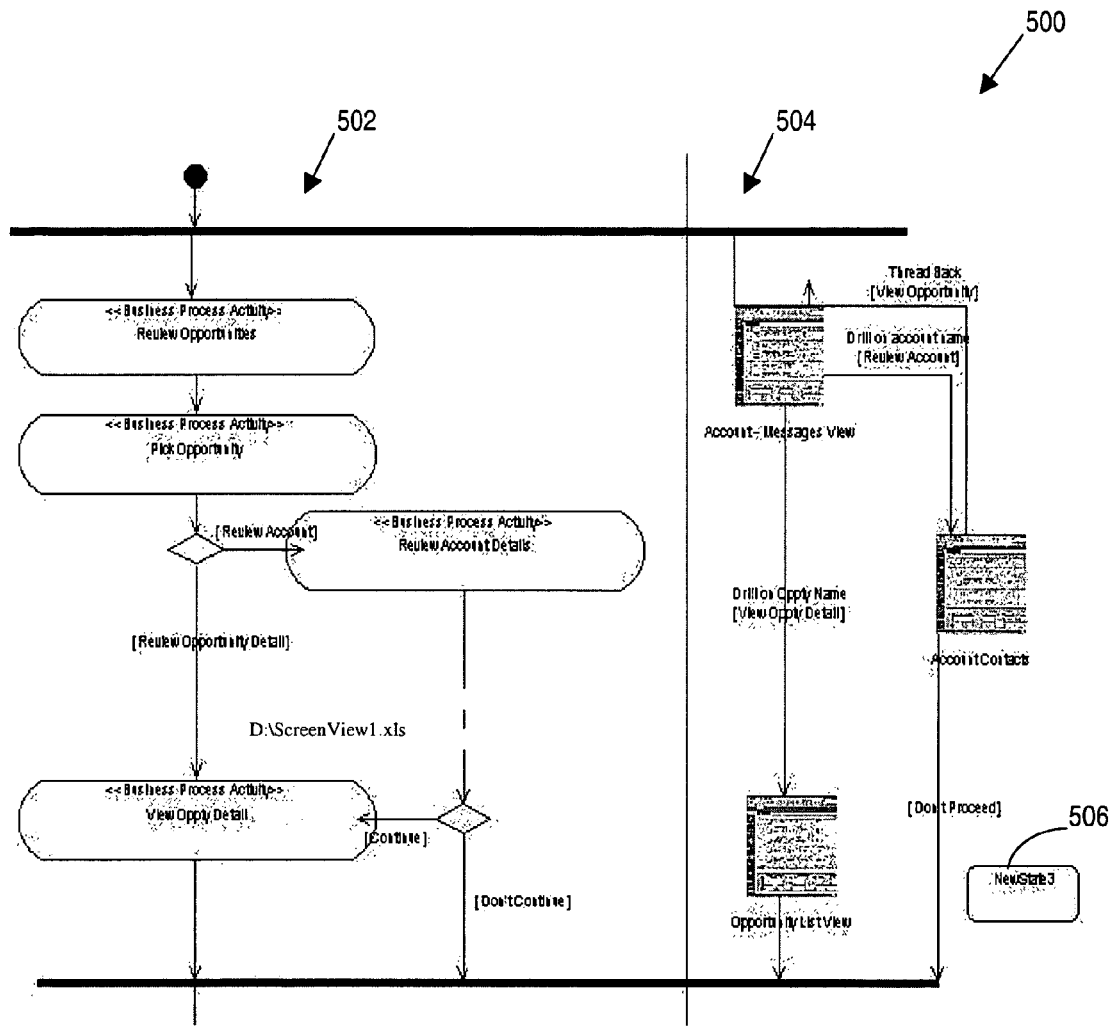
FIGS. 5A-5C illustrate exemplary user interfaces facilitating an addition of a new view to a diagram, according to one embodiment of the present invention.
Figure 5B:
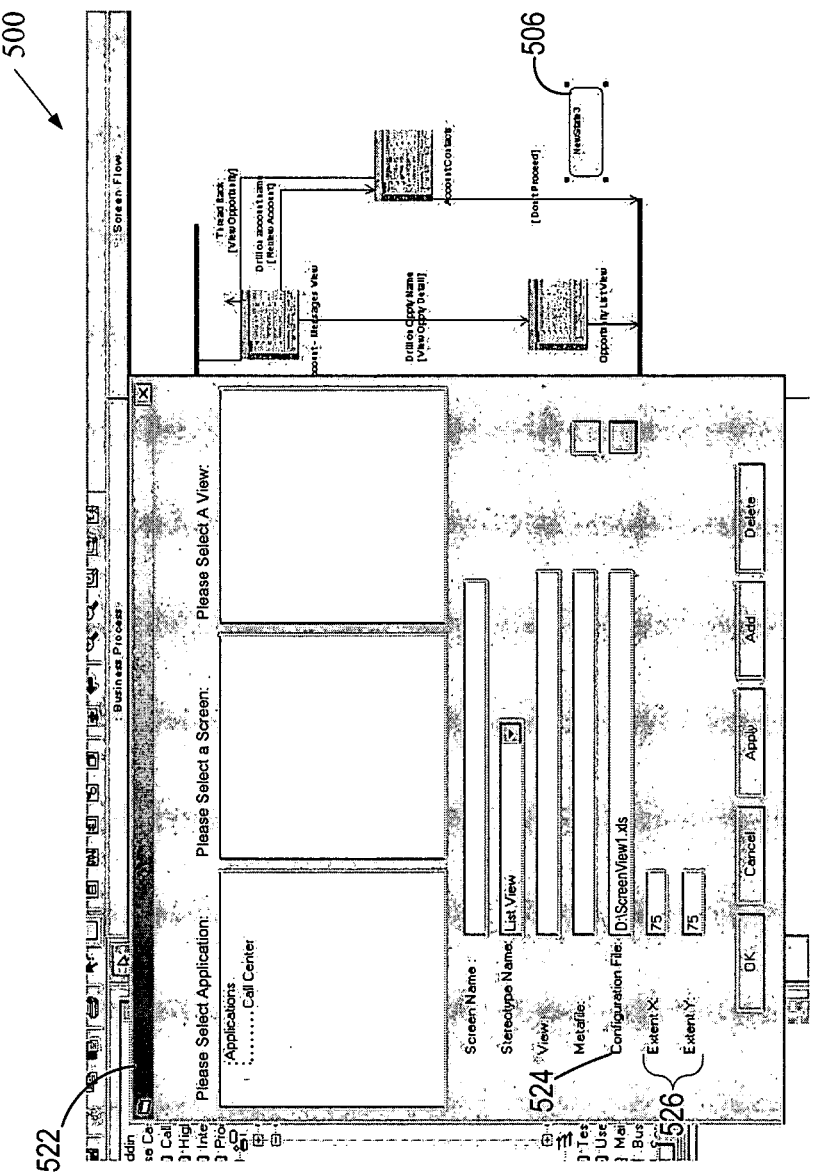
Figure 5C:
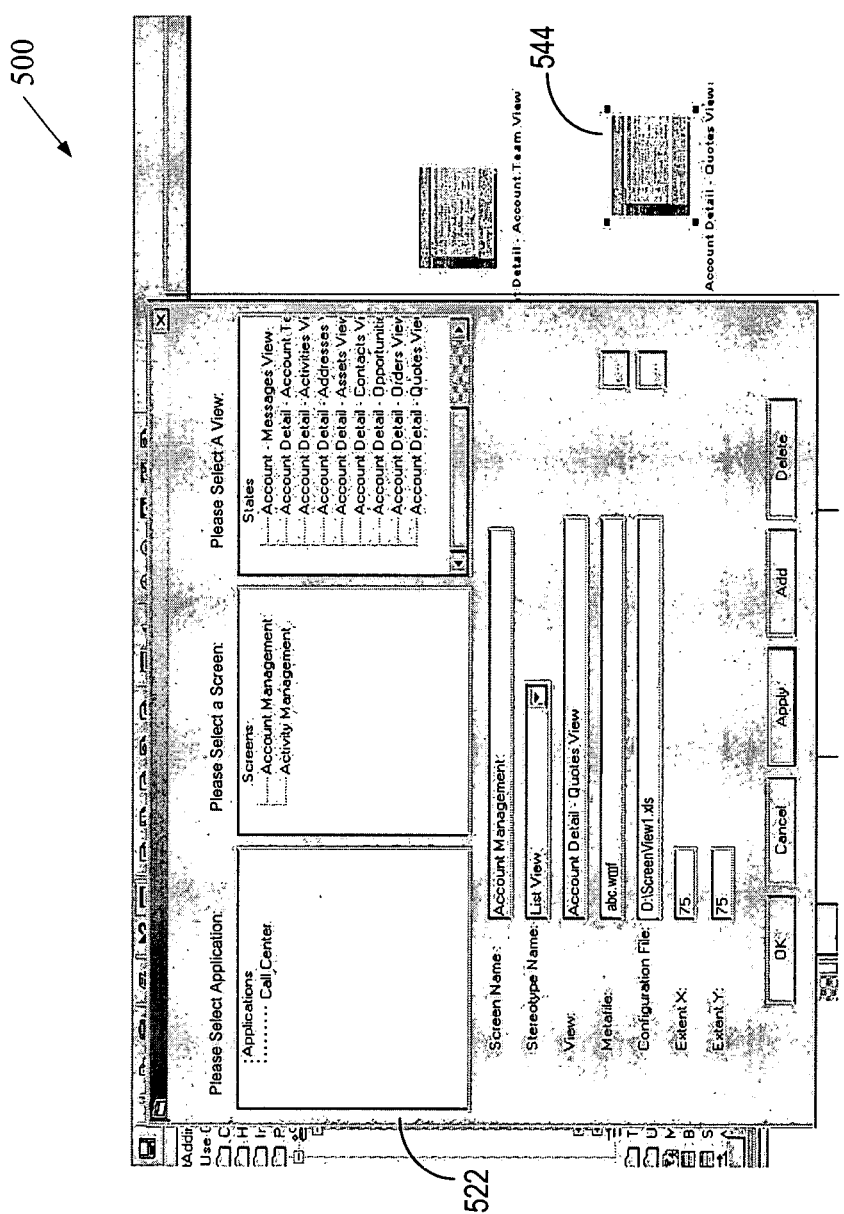

FIGS. 5A-5C illustrate exemplary user interfaces facilitating an addition of a new view to a diagram, according to one embodiment of the present invention.

Referring to FIG. 5A, a user interface 500 displayed on a portion of a computer screen contains a business process model diagram 502 and a screen flow diagram 504 including a set of views. When the user decides to add a view, the user adds a new object to the screen flow diagram 504 (this object is shown as a "new state" 506) and invokes a submenu (e.g., by clicking on new state 506 using the right button of the mouse). In the submenu, the user selects an "Add a View" option.

Referring to FIG. 5B, in response to the user selection of the "Add a View" option, a new window 522 opens up on top of user interface 500. Window 522 displays a form that allows the user to select the application product associated with the view, specify a configuration file 524, the view sizes 526, a metafile, and other information. Configuration file 524 is the file that identifies screens within the product application and corresponding views. The metafile stores bitmap images of the views.

Once the user specifies the configuration file and selects the product application, a list of screens and views appear in the form 522 as shown in FIG. 5C. The user can then select the screen and the view, specify the other necessary information, and click on an Apply button. In response, the state object changes into a bitmap image 544, thus adding a new view to the screen flow diagram.

In one embodiment, the user is provided with an option of requesting to navigate to an actual user interface in the application product. For example, the user may be allowed to click on a view using the right button of the mouse and selecting a specific option (e.g., "Navigate to a View in Application"). In response, an actual user interface is displayed in the execution mode.

Figure 6:
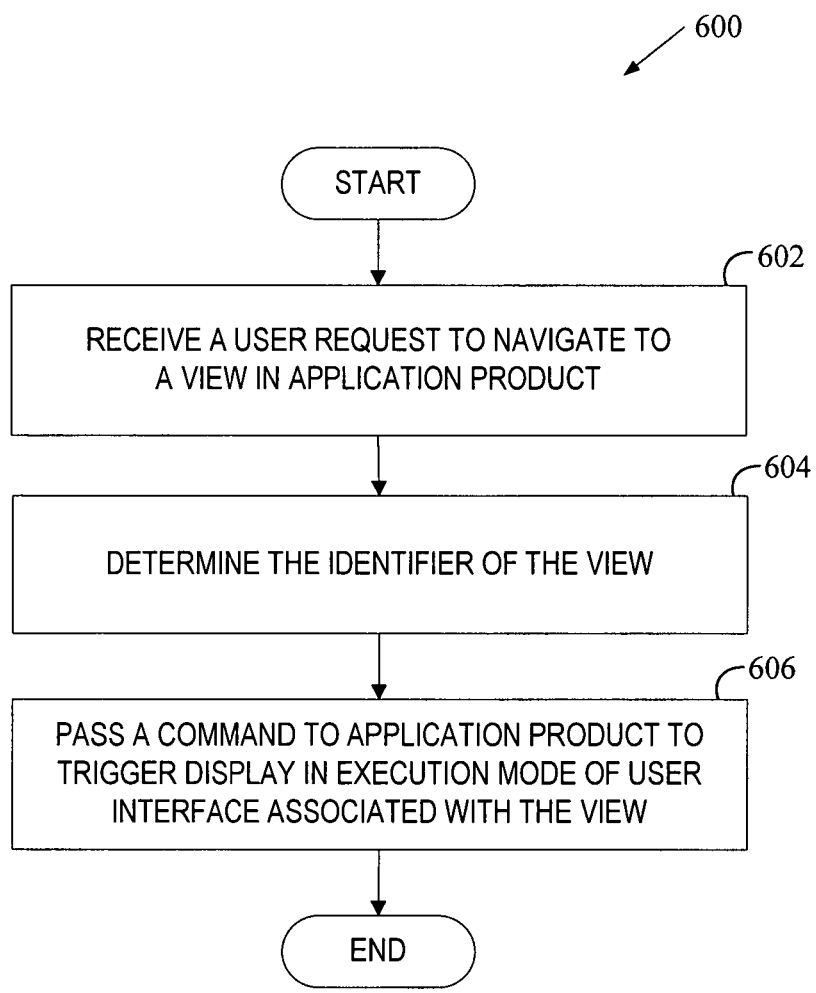
FIG. 6 is a flow diagram of a process for facilitating the navigation to a view in an application product.

FIG. 6 is a flow diagram of a process 600 for facilitating the navigation to a view in an application product. The process may be performed by processing logic that may comprise hardware (e.g., circuitry, dedicated logic, etc.), software (such as run on a general purpose computer system or a dedicated machine), or a combination of both.

Referring to FIG. 6, process 600 begins with processing logic receiving a user request to navigate to a view in an application product (processing block 302). In response, processing logic determines an identifier of the view (e.g., the view name) (processing block 304). In one embodiment, in which view identifiers differ from identifiers of corresponding user interfaces, processing logic also determines the identifier of the user interface based on data stored in a repository (e.g., linkage repository 108).

Further, at processing block 606, processing logic passes a command to the application product (which, in one embodiment, is open in the background), specifying the user interface and requesting to display the user interface in the execution mode. The application product receives the command and executes the code associated with the specified user interface. As a result, the user can observe the actual user interface and interact with it (e.g., enter data, select buttons, etc.).

In one embodiment, the user is allowed to request a transfer of a business process model to a business requirement database. In response, a set of business requirements is created and stored in the business requirements database. In one embodiment, the set of business requirements is stored under different requirement types (e.g., process type, activity type, view type, etc.) and the relationships between business requirements of different types are defined and maintained based on the structure of the business process model.

In one embodiment, an addition or a change to the business process model is automatically reflected in the business requirements database. In another embodiment, the additions and changes are not individually reflected. Instead, the user has to specifically request the transfer upon finishing the modifications, and a new set of business requirements will be created in accordance with the modified business process model.

In one embodiment, in which the user inputs data directly into the business requirements database, the user is allowed to request an export of business requirements to an external file. This external file can then be used as input by a modeling tool to create a new business process model.

Facilitating Development of Customer-Specific Application Products

Figure 7:
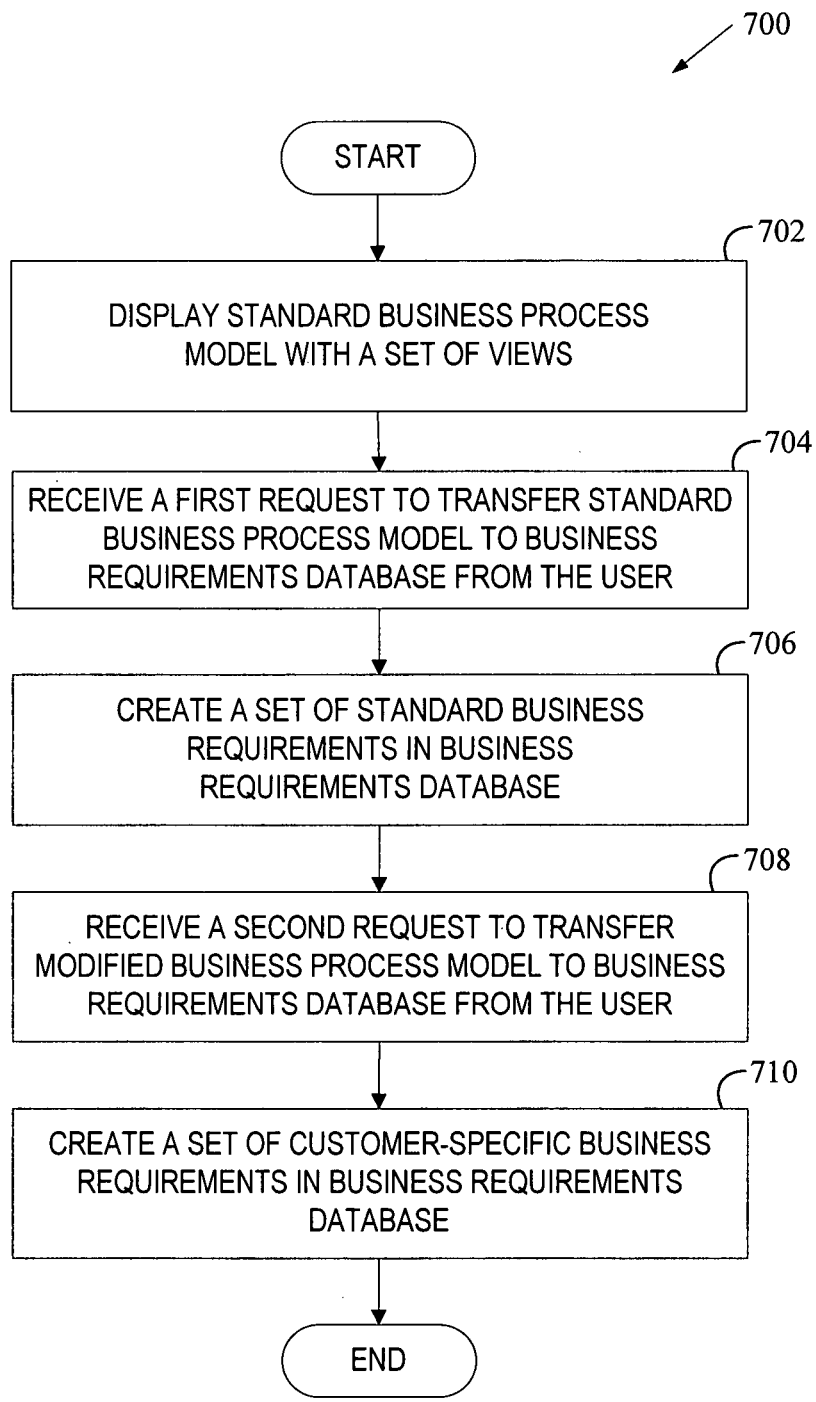
FIG. 7 is a flow diagram of a process for facilitating the development of a customer-specific application product.

FIG. 7 is a flow diagram of a process 700 for facilitating the development of a customer-specific application product. The process may be performed by processing logic that may comprise hardware (e.g., circuitry, dedicated logic, etc.), software (such as run on a general purpose computer system or a dedicated machine), or a combination of both.

Referring to FIG. 7, process 700 begins with processing logic displaying a standard business process model with a set of views (processing block 302). The standard business process model pertains to a standard application product developed for a specific industry based on the best practices found in this industry. The display of the standard business process model together with the set of views enhances the customer's understanding of the functionality provided by the standard application product, assists in the mapping of the customer's business requirements to standard functions and maximizes the use of standard functionality in the customized product.

Next, processing logic receives a user request to transfer the standard business process model to a business requirements database (processing block 704). In response, processing logic creates a set of standard business requirements and stores it in the business requirements database (processing logic 706).

Further, the customer may analyze the functionality provided by the standard application product based on the standard business process data presented as described above and proceed with modifications to the standard business process model according to the desired functionality (e.g., modifying activities and views).

Subsequently, at processing block 708, processing logic receives a user request to transfer the modified business process model to a business requirements database. In response, processing logic creates a set of customer-specific business requirements and stores it in the business requirements database (processing logic 710). As a result, the two sets of business requirements can be compared and analyzed to determine which components of the standard application product need to be modified to provide the functionality desired by the customer.

In one embodiment, the user is allowed to request a transfer of data from the business requirements database to a reporting database that is used to create various types of reports. These reports can then be used for more efficient analysis of the two sets of business requirements.

An Exemplary Computer System

Figure 8:
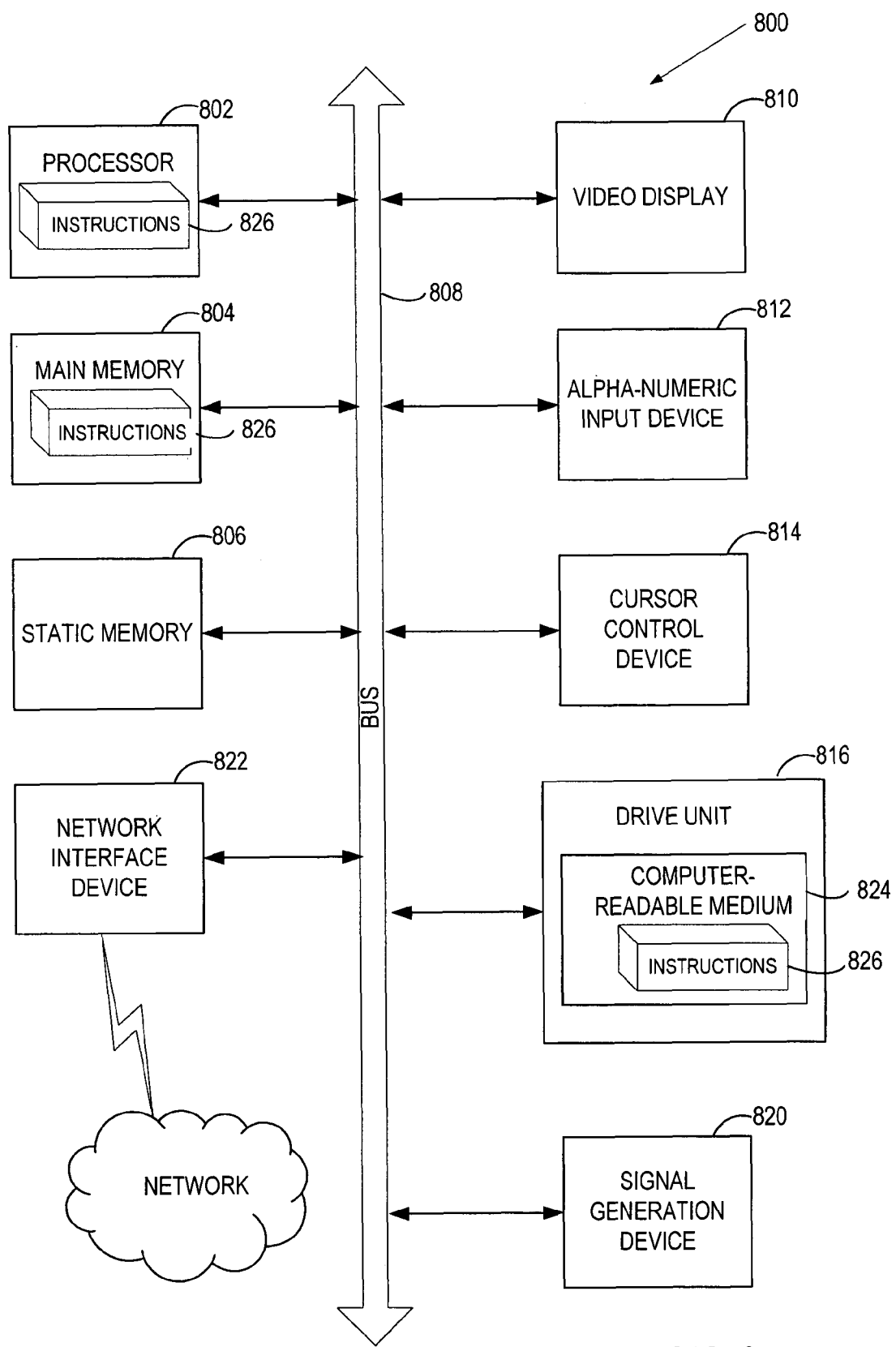
FIG. 8 is a block diagram of an exemplary computer system 800 that may be used to perform one or more of the operations described herein.

FIG. 8 is a block diagram of an exemplary computer system 800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method, implemented in a computer system, comprising:
   identifying an application product, using a processor of the computer system, wherein the application product pertains to a business process;
   creating a business process model, using the processor, wherein
      the business process model pertains to the application product, and
      the business process model is configured to represent the business process by virtue of being configured to facilitate definition of one or more relationships between ones of a plurality of business requirements;
   creating each of a plurality of views, using the processor, wherein
      the each of the plurality of views corresponds to one of a plurality of user interfaces;
   creating a plurality of identifiers, using the processor, wherein
      each identifier of the plurality of identifiers is configured to identify a corresponding one of the each of the plurality of views;
   creating an association between the business process model and the plurality of views, using the processor, wherein
      each of the plurality of views comprises
         an image representing a corresponding one of the plurality of user interfaces within the application product,
      the image is a non-interactive representation of one of the plurality of user interfaces defined by the application product,
      the application product is configured to present the plurality of views,
      the plurality of views illustrates realization of the business process within the application product,
      the creating the association comprises
         associating the each identifier of the plurality of identifiers and at least one activity, wherein
            the at least one activity is one or more activities of a plurality of activities represented in the business process model, and
      the associating comprises
         creating one of a plurality of links between the each identifier of the plurality of identifiers and the corresponding one of the each of the plurality of views, wherein the plurality of links represents the association;
   simultaneously displaying the business process model and the plurality of views within a user interface, wherein
      the user interface is displayed on a display of the computer system; and
   in response to a user selection of a first view of the plurality of views, presenting a user interface of the plurality of user interfaces, wherein
      the user interface of the plurality of user interfaces corresponds to the first view of the plurality of views,
      the user interface of the plurality of user interfaces is an interactive representation of the first view of the plurality of views, and
      the interactive representation is configured to, in response to a user input,
         accept the user input, and
         generate a result.

2. The method of claim 1, further comprising:
the creating the business process model uses data from an external file.

3. The method of claim 1, wherein
the creating the business process model uses a modeling language.

4. The method of claim 1, wherein
the business process model comprises
   graphical representations of the plurality of activities.

5. The method of claim 1, wherein associating the business process model further comprises:
storing each identifier of the plurality of identifiers, wherein
the storing stores the identifier in a repository, and
the repository is stored in a computer-readable storage medium of the computer system, and
the each identifier and the at least one activity are associated with one another in the repository.

6. The method of claim 1, wherein
the application product is a standard application product defined for a specific industry.

7. The method of claim 6, further comprising:
transforming the business process model associated with the standard application product into a set of standard business requirements, using the processor;
creating a set of user-specific business requirements, using the processor when the business process model associated with the standard application product is modified by the user;
comparing the set of standard business requirements and the set of user-specific business requirements, using the processor; and
based on a result of the comparing, determining, using the processor, one or more components of the standard application product that need to be modified to provide a user-specific functionality to the standard application product.

8. A computer program product comprising:
a first set of instructions, executable on a computer system, configured to identify an application product, wherein
the application product pertains to a business process;
a second set of instructions, executable on the computer system, configured to create a business process model, wherein
the business process model pertains to the application product, and
the business process model is configured to represent the business process by virtue of being configured to facilitate definition of one or more relationships between ones of a plurality of business requirements;
a third set of instructions, executable on the computer system, configured to create each of a plurality of views, wherein
the each of the plurality of views corresponds to one of a plurality of user interfaces;
a fourth set of instructions, executable on the computer system, configured to create a plurality of identifiers, wherein
each identifier of the plurality of identifiers is configured to identify a corresponding one of the each of the plurality of views;
a fifth set of instructions, executable on the computer system, configured to create an association between the business process model and the plurality of views, wherein
the plurality of views illustrates realization of the business process within the application product,
the application product is configured to present the plurality of views,
each of the plurality of views comprises
an image representing a corresponding one of a plurality of user interfaces within the application product,
the image is a non-interactive representation of one of the plurality of user interfaces defined by the application product,
the fifth set of instructions comprises
a first subset of instructions, executable on the computer system, configured to associate the each identifier of the plurality of identifiers and at least one activity, wherein
the at least one activity is one or more activities of a plurality of activities represented in the business process model, and
the first subset of instructions comprises
a first sub-subset of instructions, executable on the computer system, configured to create one of a plurality of links between the each identifier of the plurality of identifiers and the corresponding one of the each of the plurality of views, wherein
the plurality of links represents the association;
a sixth set of instructions, executable on the computer system, configured to simultaneously display the business process model and the plurality of views within a user interface, wherein
the user interface is displayed on a display of the computer system;
a seventh set of instructions, executable on the computer system, configured to present a user interface of the plurality of user interfaces, in response to a user selection of a first view of the plurality of views, wherein
the user interface of the plurality of user interfaces corresponds to the first view of the plurality of views,
the user interface of the plurality of user interfaces is an interactive representation of a first view of the plurality of views, and
the interactive representation is configured to, in response to a user input,
accept the user input, and
generate a result; and
a non-transitory computer-readable storage medium, wherein the computer program product is encoded in the non-transitory computer-readable storage medium.

9. The computer program product of claim 8, wherein the second set of instructions are configured to create the business process model using data from an external file.

10. The computer program product of claim 9, wherein the business process model is created in a modeling language.

11. The computer program product of claim 8, wherein the first subset of instructions further comprise:
a second sub-subset of instructions, executable on the computer system, configured to store each identifier of the plurality of identifiers, wherein
the second sub-subset of instructions stores the identifier in a repository, and
the repository is stored in a computer-readable storage medium of the computer system, and
the each identifier and the at least one activity are associated with one another in the repository.

12. The computer program product of claim 8, wherein the application product is a standard application product defined for a specific industry.

13. The computer program product of claim 8, wherein the computer program product further comprises:
a eighth set of instructions, executable on the computer system, configured to modify the plurality of views displayed to the user in response to a user request.

14. The computer program product of claim 8, wherein the computer program product further comprises:
an eighth set of instructions, executable on the computer system, configured to receive a user request to navigate to one of the plurality of views in the application product;

a ninth set of instructions, executable on the computer system, configured to determine a view identifier; and a tenth set of instructions, executable on the computer system, configured to pass a command to the application product to trigger display of a user interface associated with the view identifier in execution mode.

15. The computer program product of claim 12, further comprising:

a eighth set of instructions, executable on the computer system, configured to transform the business process model pertaining to the standard application product into a set of standard business requirements;

a ninth set of instructions, executable on the computer system, configured to create a set of user-specific business requirements when the business process model pertaining to the standard application product is modified by the user;

an tenth set of instructions, executable on the computer system, configured to compare the set of standard business requirements and the set of user-specific business requirements; and a eleventh set of instructions, executable on the computer system, configured to determine, based on a result produced by the tenth set of instructions, one or more components of the standard application product that need to be modified to provide a user-specific functionality to the standard application product.

16. A system comprising:
a processor;
a display, coupled to the processor;
a computer-readable storage medium, coupled to the processor; and
a linkage process, stored in the computer-readable storage medium and configured to cause the processor to
  identify an application product, wherein
    the application product pertains to a business process,
  create a business process model, wherein
    the business process model pertains to the application product, and
    the business process model is configured to represent the business process by virtue of being configured to facilitate definition of one or more relationships between ones of a plurality of business requirements, and
  create each of a plurality of views, wherein
    the each of the plurality of views corresponds to one of a plurality of user interfaces,
  create a plurality of identifiers, wherein
    each identifier of the plurality of identifiers is configured to identify a corresponding one of the each of the plurality of views,
  create an association between the business process model and the plurality of views, wherein
    each of the plurality of views is an image representing a corresponding one of a plurality of user interfaces within the application product,
    the image is a non-interactive representation of one of the plurality of the user interfaces defined by the application product,
    the application product is configured to present the plurality of views,
    the plurality of views illustrates realization of the business process within the application product, the linkage process is configured to create the association by virtue of being configured to cause the processor to
    associate the each identifier of the plurality of identifiers and at least one activity, wherein
      the at least one activity is one or more activities of a plurality of activities represented in the business process model,
  the linkage process is configured to associate the each identifier and the at least one activity by virtue of being configured to cause the processor to
    create one of a plurality of links between the each identifier of the plurality of identifiers and the corresponding one of the each of the plurality of views, wherein the plurality of links represents the association,
  the linkage process is further configured to cause the processor to simultaneously display the business process model and the plurality of views within a user interface, wherein
    the user interface is displayed on the display, and
  the linkage process is further configured to cause the processor to present a user interface of the plurality of user interfaces, in response to a user selection of a first view of the plurality of views, wherein
    the user interface of the plurality of user interfaces corresponds to the first view of the plurality of views,
    the user interface of the plurality of user interfaces is an interactive representation of a first view of the plurality of views, and
    the interactive representation is configured to, in response to a user input,
      accept the user input, and
      generate a result.

17. The system of claim 16, wherein
the business process model is created in a modeling language.

18. The system of claim 16, wherein
the linkage process is configured to cause the processor to create the association by virtue of being configured to
  store an identifier of a plurality of identifiers, wherein
    the identifier is stored in a repository, and
    the repository is stored in the computer-readable storage medium,
  the each identifier and the at least one activity are associated with one another in the repository.

19. The system of claim 16, wherein
the application product is a standard application product defined for a specific industry.

20. The system of claim 19, wherein the linkage process is further configured to cause the processor to:
  transform the business process model pertaining to the standard application product into a set of standard business requirements;
  create a set of user-specific business requirements when the business process model pertaining to the standard application product is modified by the user;
  compare the set of standard business requirements and the set of user-specific business requirements; and
  based on a result of the comparison, determine one or more components of the standard application product that need to be modified to provide a user-specific functionality to the standard application product.

* * * * *